UNITED STATES PATENT OFFICE.

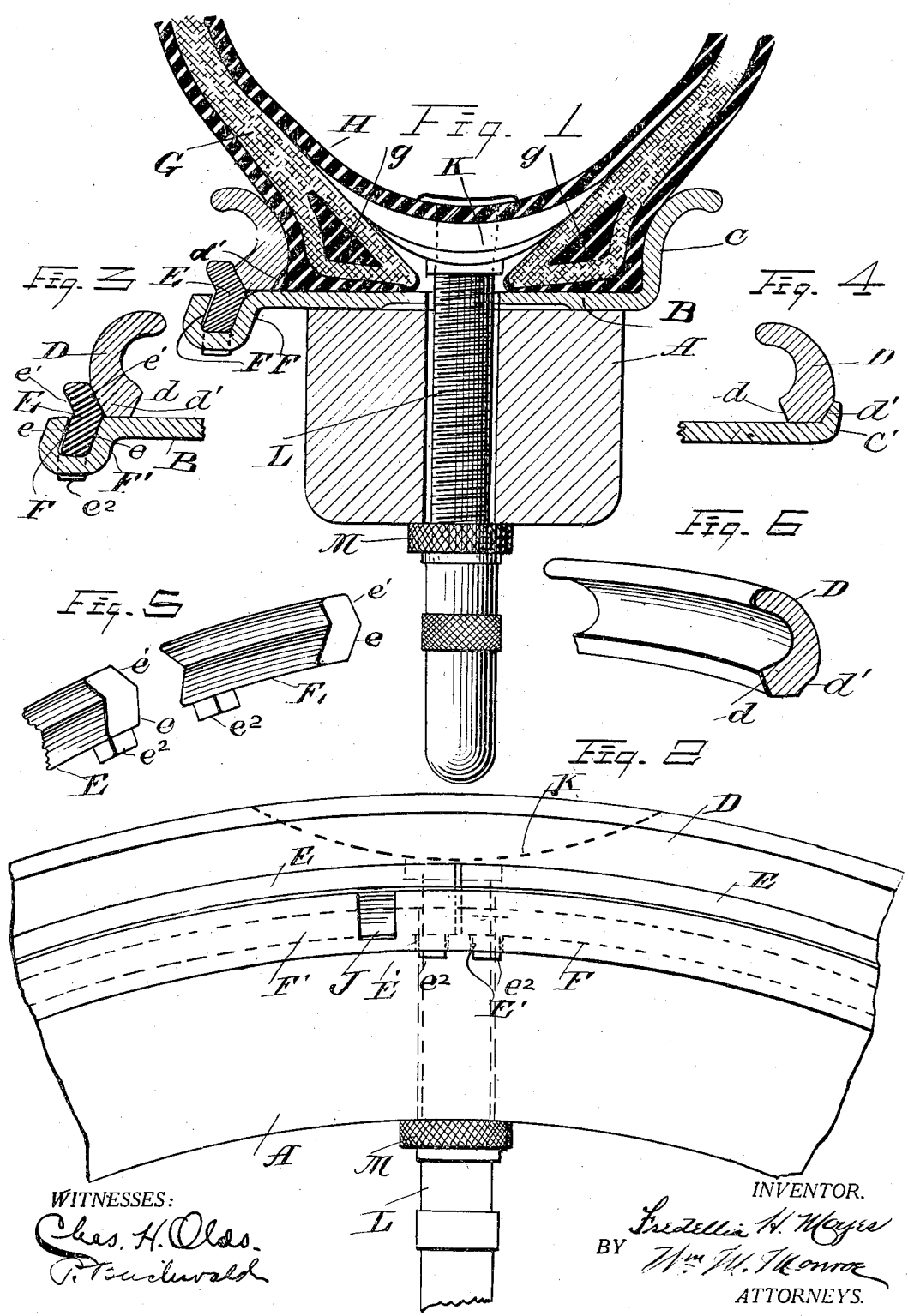

FREDELLIA H. MOYER, OF EUCLID HEIGHTS VILLAGE, OHIO.

RIM FOR PNEUMATIC TIRES.

1,202,206.   Specification of Letters Patent.   Patented Oct. 24, 1916.

Application filed February 5, 1915. Serial No. 6,232.

*To all whom it may concern:*

Be it known that I, FREDELLIA H. MOYER, a citizen of the United States, and resident of Euclid Heights village, in the county of Cuyahoga and State of Ohio, have invented certain new and useful Improvements in Rims for Pneumatic Tires. of which I hereby declare the following to be a full, clear, and exact description, such as will enable others skilled in the art to which it appertains to make and use the same.

The objects of the invention are to provide an improved form of split retaining ring for the outer side of a tire retaining ring for a detachable tire holding rim.

The particular objects of the invention are to provide an outer retaining ring of such shape that it will remain stationary in its position without rocking or movement of any kind when the tire is expanded and it is exposed to great lateral pressure.

Further objects of the invention are to provide a split outer retaining ring of such shape that it can be easily removed by inserting a tool underneath the same, and which is so shaped as to engage and have the effect of pressing the side ring, engaging therewith, out of its way while it is being removed, thus permitting the operation of removal in one act without the application of a separate tool to remove the side ring.

The invention also comprises an outer retaining ring of > shape in section, the sides of which are inclined to obtain a firm hold upon the walls of its retaining groove when placed under pressure, and also adapted to press the tire holding side ring laterally and inwardly when the retaining ring is raised from its seat.

It also includes means for retaining the extremities of the outer split retaining ring, and the adjacent side ring in place.

The invention is hereinafter described, illustrated in the accompanying drawings and specifically pointed out in the claims.

In the accompanying drawings Figure 1 is a transverse section of the rim and felly of an automobile wheel, showing the tire holding devices; Fig. 2 is a side elevation thereof; Fig. 3 is a transverse section of the rim showing the outer edge with the retaining rings arranged to receive a clencher tire; Fig. 4 is a similar view of the inner edge thereof; Fig. 5 is a perspective view of the split extremities of the outer ring; Fig. 6 is a transverse section of one of the continuous side or tire holding rings.

In these views A is the felly, B is the tire holding rim, C is the inner tire holding flange, which is shown in Fig. 1 to be of the form required for the straight side tire, but a movable and reversible side ring may be substituted therefor if desired.

D is the reversible outer movable side ring arranged for a straight side tire or casing to correspond with the flange C, and E is an outer split retaining ring for said side ring D.

In Figs. 3 and 4 two side rings D, D, are shown and are reversed to accommodate the clencher tire.

The outer retaining ring E is inserted within an annular seat or groove F formed in a lateral extension F' in the rim B.

G, Fig. 1 represents the casing and H is the inner or inflatable tube.

The ring E is > shaped in cross section, that is, its sides, are reversely inclined at $e$, $e'$ and the side walls of the groove F are preferably correspondingly inclined in a lateral direction as shown in Figs. 1 and 5, the effect of which is to more firmly seat the outer retaining ring in the groove, the greater the lateral pressure that is put upon it, as the tire is inflated.

The portion of the outer and split ring where it engages the adjacent side ring D is inclined so as to exert a lateral pressure upon the side ring and force it inwardly against the casing when pressure is applied to an extremity of the outer ring, in a radially outward direction, to remove the same from its groove. The action of forcing the retaining ring E out of its seat will force the side ring against the casing and when deflated remove it out of the way of the retaining ring E. To facilitate this action the engaging face of the side ring is correspondingly inclined at $d$.

As shown in Fig. 2 the removal of the retaining ring E is accomplished by inserting the point of a screw driver or other tool underneath one extremity of the retaining ring, through an opening J provided for this purpose in the wall F' of the rim.

The split ring E is provided at one extremity with a retaining radial lug $e^2$, which is inserted in an opening E' in the bottom of the groove F and the other extremity may be provided with the same retaining means if desired, as shown in Fig. 5. The extremities of the split retaining ring E are firmly secured in place when the tire is inflated by the pressure of the beads g, g, of the casing G, against them. To further bear down upon them so as to secure their extremities from accidental release, the pressure plate K attached to the valve stem L is made wedge shaped and by means of a nut M is drawn down and forces the beads of the casing outwardly against them so that they are amply protected from danger of accidental release. The valve stem is therefore located at the split extremities of said outer retaining ring E.

The advantages of a retaining ring of this shape and its efficiency and practicability in use are obvious, since the pressure of the expanded casing always has a tendency to roll the ring over and to release it from its seat in its groove, but with this shape and manner of construction the greater the internal pressure upon the tire, the greater the immobility of the ring. Also the feature of its engaging the side ring with an inclined face greatly facilitates the removal of the retaining ring E from the rim.

In Figs. 2, 3, and 4 the side rings D, D, are shown reversed in position and hence are provided each with an additional inclined face d' to correspond with the engaging face of the split ring, and a corresponding inclined face on the outer flange C'.

Having described the invention what I claim as new and desire to secure by Letters Patent is:

1. The combination with a rim having an annular groove in its face, having parallel sides inclined outwardly, of a reversible tire holding ring sleeved over said rim, and an angular locking ring therefor, having its inner sides reversely inclined, one inclined edge of the ring entering said groove, and the other inclined edge engaging the outer face of said side ring.

2. The combination with a tire holding rim having an annular marginal groove in its outer face, the side walls of said groove being substantially parallel and inclined outwardly, and a tire and casing mounted upon said rim, of a casing retaining ring sleeved over said rim, a locking ring for said casing retaining ring, said locking ring having its outer sides reversely inclined to form a reëntrant, one inclined edge thereof being inserted in said groove, and the other inclined edge engaging the outer side of said casing retaining ring, and means for securing the extremities of said side and retaining rings in place, including a valve stem passing through said casing and a pressure plate thereon, exerting radial and lateral pressure upon said casing and retaining and locking rings therefor.

In testimony whereof, I hereunto set my hand this 2nd day of February, 1915.

FREDELLIA H. MOYER.

In presence of—
 WM. J. KLOTZBACH,
 WM. M. MONROE.